US006211581B1

(12) United States Patent
Farrant (10) Patent No.: US 6,211,581 B1
(45) Date of Patent: Apr. 3, 2001

(54) POWER BAR WITH REMOTE CONTROL

(76) Inventor: Harvard M. Farrant, 62 Ferrier Avenue, Toronto (CA), M4K 3H5

(*) Notice: Subject to any disclaimer, the term of this patent is extended or adjusted under 35 U.S.C. 154(b) by 0 days.

(21) Appl. No.: 09/199,906

(22) Filed: Nov. 25, 1998

Related U.S. Application Data

(60) Provisional application No. 60/066,916, filed on Nov. 28, 1997, provisional application No. 60/077,006, filed on Mar. 6, 1998, and provisional application No. 60/082,539, filed on Apr. 21, 1998.

(51) Int. Cl.[7] ........................................... H02J 3/00
(52) U.S. Cl. ........................ 307/117; 307/38; 307/115
(58) Field of Search ............................ 307/40, 41, 115, 307/116, 117, 38; 345/156, 168

(56) References Cited

U.S. PATENT DOCUMENTS

| D. 411,169 | * | 6/1999 | West .................................. D13/139.8 |
| 5,164,609 | * | 11/1992 | Poppe et al. ........................... 307/116 |
| 5,250,851 | | 10/1993 | McKnight et al. . | |
| 5,359,540 | * | 10/1994 | Ortiz .................................... 307/115 |
| 5,424,903 | * | 6/1995 | Schreiber ............................. 307/41 |
| 5,550,649 | * | 8/1996 | Wong et al. .......................... 358/479 |
| 5,675,813 | * | 10/1997 | Holmdahl ............................. 395/750 |
| 5,831,597 | * | 11/1998 | West et al. ............................ 345/156 |
| 5,841,424 | * | 11/1998 | Kikinis ................................. 345/168 |

OTHER PUBLICATIONS

Article posted on Internet (www.webshopper.com), "Powerkey Pro 600", David Pogue, Sep. 1997.*
"PowerKey Pro 600", product info, Internet (www.sophisticated.com), Sep. 1999.*
"MultiPal", product info, Internet (www.dataprobe.com), Aug. 1999.*

* cited by examiner

Primary Examiner—Fritz Fleming
Assistant Examiner—Roberto J Rios Cuevas
(74) Attorney, Agent, or Firm—Young & Basile, P.C.

(57) ABSTRACT

The Power Bar with Remote Control allows a user to control from a distance the power of each outlet contained in the attached Power Bar. A master switch also allows the power to all outlets to be turned on or off in unison. Therefore, a user can selectively turn on or off electrical devices attached to the Power Bar. For example, while sitting at a desk a person could use the Remote Control to turn on their personal computer, monitor, speakers, external modem, printer and desk lamp. Also, by integrating the Power Bar with a USB (or Firewire) hub, only a single composite cable, with either integrated AC power/USB plugs or separate AC power and USB plugs at each end is required to supply both power and data to a PC or peripheral device. Also, by integrating an under-the-monitor type power box with a USB (or Firewire) hub, only a single composite cable, with either integrated AC power/USB plugs or separate AC power and USB plugs at each end is required to supply both power and data to a PC or peripheral device.

13 Claims, 14 Drawing Sheets

POWER BAR WITH REMOTE CONTROL

This application claim benefit to Provisional Application Ser. No. 60/066,916 Nov. 28, 1997 and Provisional Application Ser. No. 60/077,006 Mar. 6, 1998 and Provisional Application Ser. No. 60/082,539 Apr. 21, 1998.

FIELD OF THE INVENTION

This invention relates in general to power bars and more specifically to a power bar which contains power outlets that can be selectively turned on or off by using a remote control unit. And, relates to a power outlet that can be integrated with a USB (or Firewire) hub.

BACKGROUND OF THE INVENTION

Power bars are an important part of any type of multiple electrically powered household or business wiring. Power bars provide a user with more outlets than the usual two provided in an electrical wall socket. Presently, there are two related prior art power bars on the market. The first is a typical power bar which normally contains 4 to 6 power outlets. The power bar usually has a built-in master switch that turns power on or off to all outlets. Therefore, to turn on or off all power a user must physically reach the power bar, typically located on the floor, to access the master switch. Alternatively, if the user wants to selectively turn off separate devices, the user must directly access the power switch of each separate device.

The second prior art product is a power bar which has a separate built-in switch for each power outlet and a master power switch as disclosed in U.S Pat. No. 5,250,851. This power bar allows a user to selectively switch off power to a desired electrical device. However, these power bars (or power boxes) are quite bulky and quite heavy so as to support the weight of a CRT monitor. Also, all power cables must be attached to the back of the power bar which, typically sits on a desktop. The manufacture and purchase cost of such a device is quite significant.

SUMMARY OF THE INVENTION

The present invention provides a solution to the aforementioned problems. A first aspect of the present invention is that any electrical device connected to the present invention can be turned on or off by a remote control. The remote control is small in size and lightweight and thus is very inexpensive to manufacture. Another aspect of the present invention is that the cord connecting the remote control to the power bar may be disconnected at either end to allow different lengths of extension cords to be added in order to increase the distance between the power bar and the remote control. Also, the extension cords and the power bar can be easily hidden from sight and not necessarily require easy access. The power bar need not be within close proximity to the remote control for operation of the remote control and optionally the remote control may be wireless or connected via USB (or Firewire IEEE 1394) protocol. It is generally understood that USB stands for Universal Serial Bus which is a protocol which provides universal compatibility for all connected components, and Firewire (IEEE 1394) stands for High Performance Serial Bus (HPSB) which also provides universal compatibility for all connected components. A third aspect of the present invention is that the remote control may also be removed from the power bar and capping of the socket of the remote control provides a normal power bar. Yet another aspect of the present invention is that the remote control can be built into, installed into, or attached to another electrical device such as a personal computer, a CRT monitor, a keyboard etc. for added convenience. A fifth aspect includes ability to control the remote control and, in turn, power bar via an external telephone. A sixth aspect includes the ability to integrate a power bar with a USB (or Firewire) hub which allows PC and peripheral devices to be connected to each other via a single composite cable with dual plugs at both ends.

BRIEF DESCRIPTION OF THE DRAWINGS

An embodiment of the invention is described below with reference to the accompanying drawings, in which.

DETAILED DESCRIPTION OF THE PREFERRED EMBODIMENTS

Figure 1:
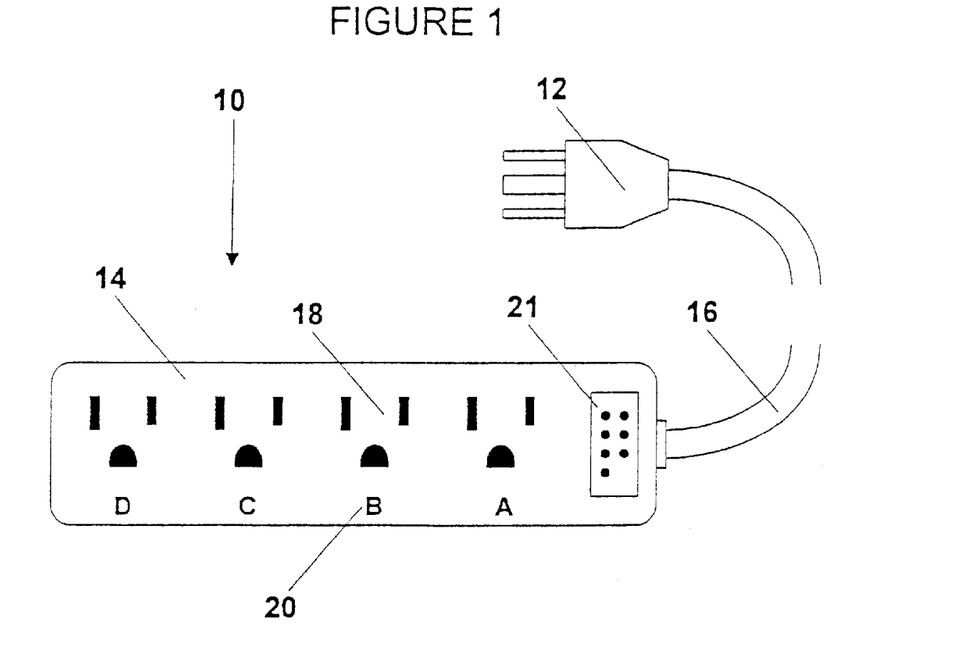
FIG. 1 is a top view of a slave power bar with four outlets.

Turning to FIG. 1, a top view is provided of a slave power bar unit 10. The power bar unit 10 has a three prong plug 12 which is connected to a 4-outlet power bar 14 via an electrical cord 16. Although four outlets are shown, it will be understood by one skilled in the art that the power bar unit only requires a minimum of one outlet. Each three-prong outlet 18 has a corresponding label 20 that matches with a same label 34 on a remote control unit 22 (shown in FIG. 2). The power bar 14 connects to the remote control unit 22 via a female socket 21 which is keyed to ensure proper connection to a custom extension cord 24. In the preferred embodiment, the female socket 21 is a 7-hole socket for use with the power bar 14.

Figure 2:
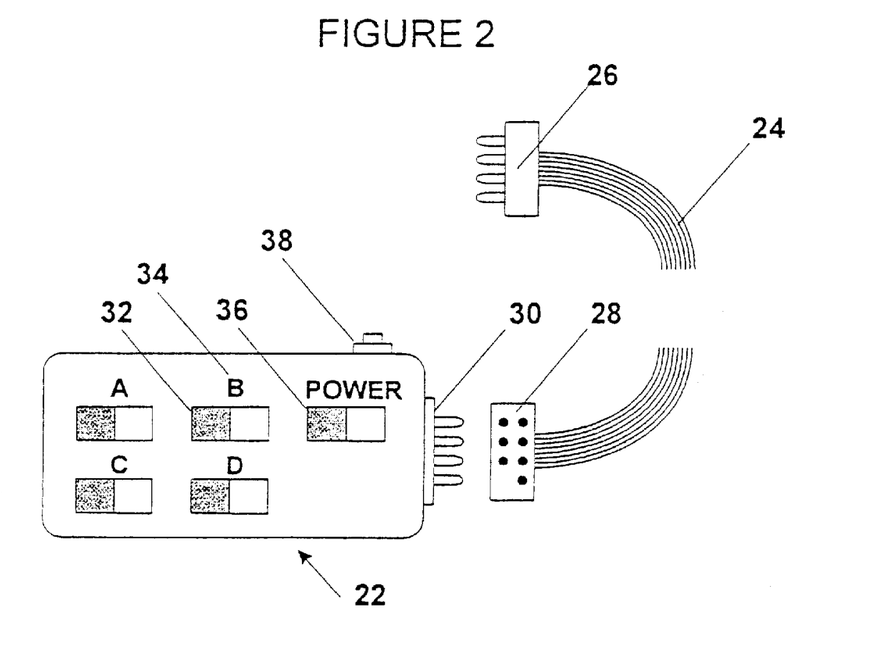
FIG. 2 is a top view of a master remote control and a custom extension cord that connects the master remote control to the power bar.

Turning to FIG. 2, a top view is provided of the remote control unit 22. A male plug 26, 7-pin in the preferred embodiment, connects to the female socket 21 of the slave power bar unit 10. The male plug 26 also connects to a female socket 28 via the custom extension cord 24. The female socket 28, which in the preferred embodiment is keyed, attaches to a male plug 30 of the remote control unit 22. The remote control 22 of this embodiment, and other embodiments described below, include means for generating a signal unique to each of the power outlets 18 for control of and communication with the power outlets 18. In all of the embodiments described, the means are an individual outlet power switch 32. It will be understood by one skilled in the art that the means may also be a predetermined numeric sequence on a keypad. Each switch 32 has a label 34 which correspondingly matches with the labels 20 on the slave power bar 14. The remote control unit 22 also has a master power switch 36 which turns power on or off to all outlets 18 on the power bar 14. The remote control unit 22 can also incorporate an optional surge protection circuit reset switch 38. It should be noted that surge protection circuitry and other filters such as EMI and RFI may be built into either the power bar unit 10 or the remote control unit 22. However, to reduce the cost, size and weight of the remote control unit 22 in the preferred embodiment of the present invention, such circuitry is preferably built into the power bar unit 10.

Figure 3:
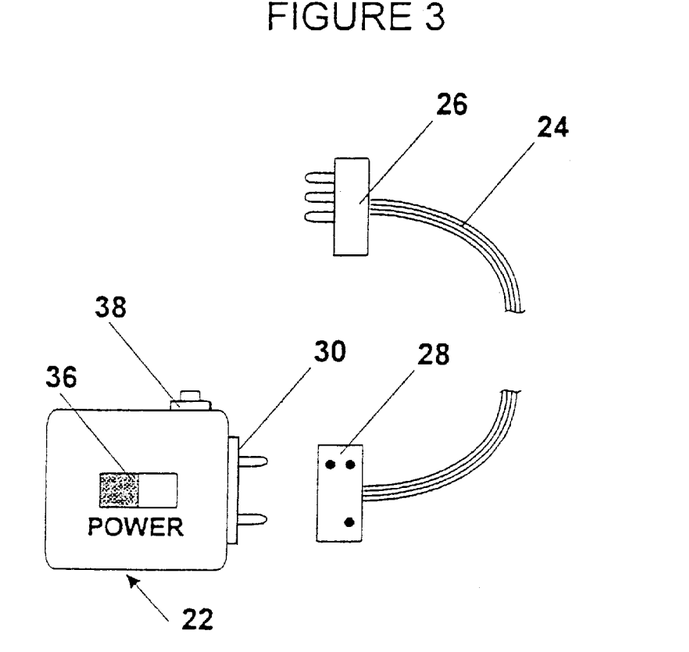
FIG. 3 is a top view of a single switch remote control and a custom extension cord that connects the single switch remote control to the power bar.

Turning to FIG. 3, an alternative embodiment of the remote control unit 22 is shown. As before, the male plug 26 connects to the female socket 21 of the slave power bar unit 10. It will be understood by one skilled in the art that in this embodiment, the female socket 21 will be 3-holed to accept the male plug 26. The male plug 26 is connected to the female socket 28 via the custom extension cord 24. The keyed socket 28, 3-hole in the alternative embodiment, attaches to the male plug 30 of the remote control unit 22. The remote control unit 22 has a single master power switch 36 which turns power on or off at the same time to all the outlets 18 on the power bar unit 10. The remote control unit 22 can also incorporate optional surge protection circuit reset switch 38.

Figure 4:
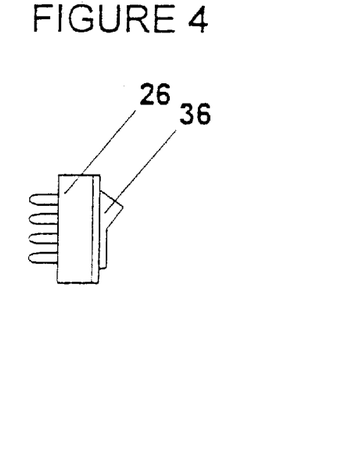
FIG. 4 is a side view of a slave power bar cap with a built-in switch.

Turning to FIG. 4, a male plug 26, 7-pin in the preferred embodiment, connects to the female socket 21 of the slave power bar unit 10. It will be understood by one skilled in the art that the female socket 21 must be 7-holed in order to accept the male plug 26. The plug 26 can incorporate an optional power switch 36 which turns power on or off to all outlets 18 on the power bar unit 10. The combination of the plug 26 and optional switch 36 converts the slave power bar unit 10 into an ordinary power bar unit.

Figure 5:
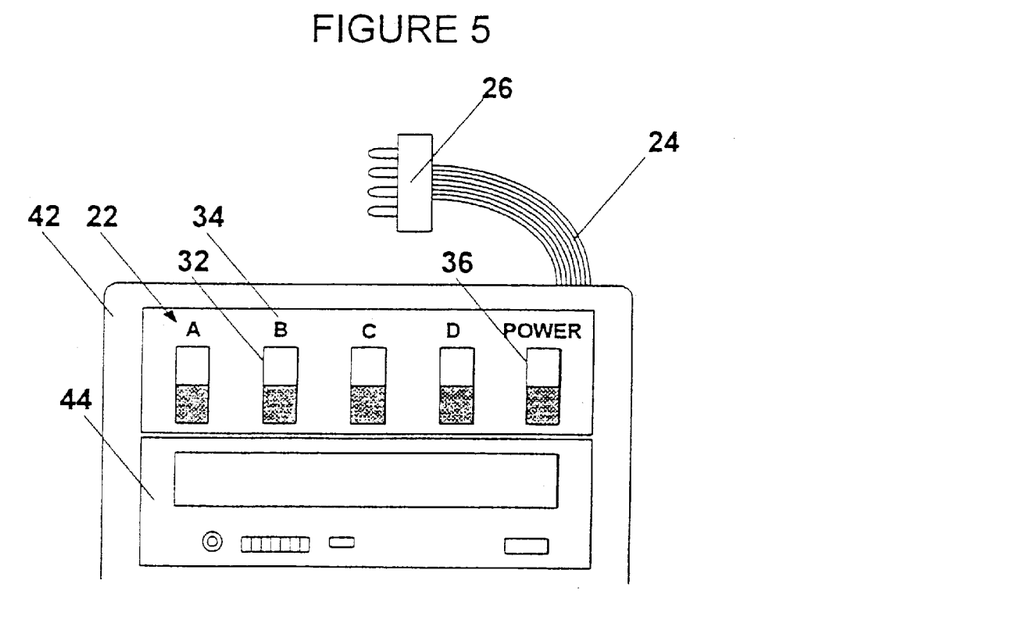
FIG. 5 is a front view of a PC master remote control and a custom extension cord that connects the PC master remote control to the power bar.

Turning to FIG. 5, a front view of the remote control unit 22 integrated into a PC 42 is shown. The male plug 26, 7-pin in this example, connects to the female socket 21 of the slave power bar unit 10. The male plug 26 is connected via the custom extension cord 24 to a keyed female socket (not shown). The other end of the extension cord 24 connects to a male plug (not shown) at the back of the PC 42. The male plug (not shown) can be either built into the chassis of the PC 42 or attached to a back plate of a spare card slot. A custom extension cord (not shown) inside the PC 42 connects the male plug (not shown) at the back of the PC 42 to the remote control unit 22 at the front. Each individual outlet power switch 32 has label 34 that matches with the corresponding power outlet 18 on the slave power bar unit 10. The remote control unit 22 includes master power switch 36 which turns power on or off to all outlets 18 on the power bar unit 10. The remote control unit 22 can also incorporate an optional surge protection circuit reset switch (not shown). The remote control unit 22 could be installed into a spare access bay of the PC 42 similar to installation for other devices, such as a CD ROM drive 44. Alternatively, the remote control unit 22 could be built directly into the chassis of the PC 42.

Figure 6:
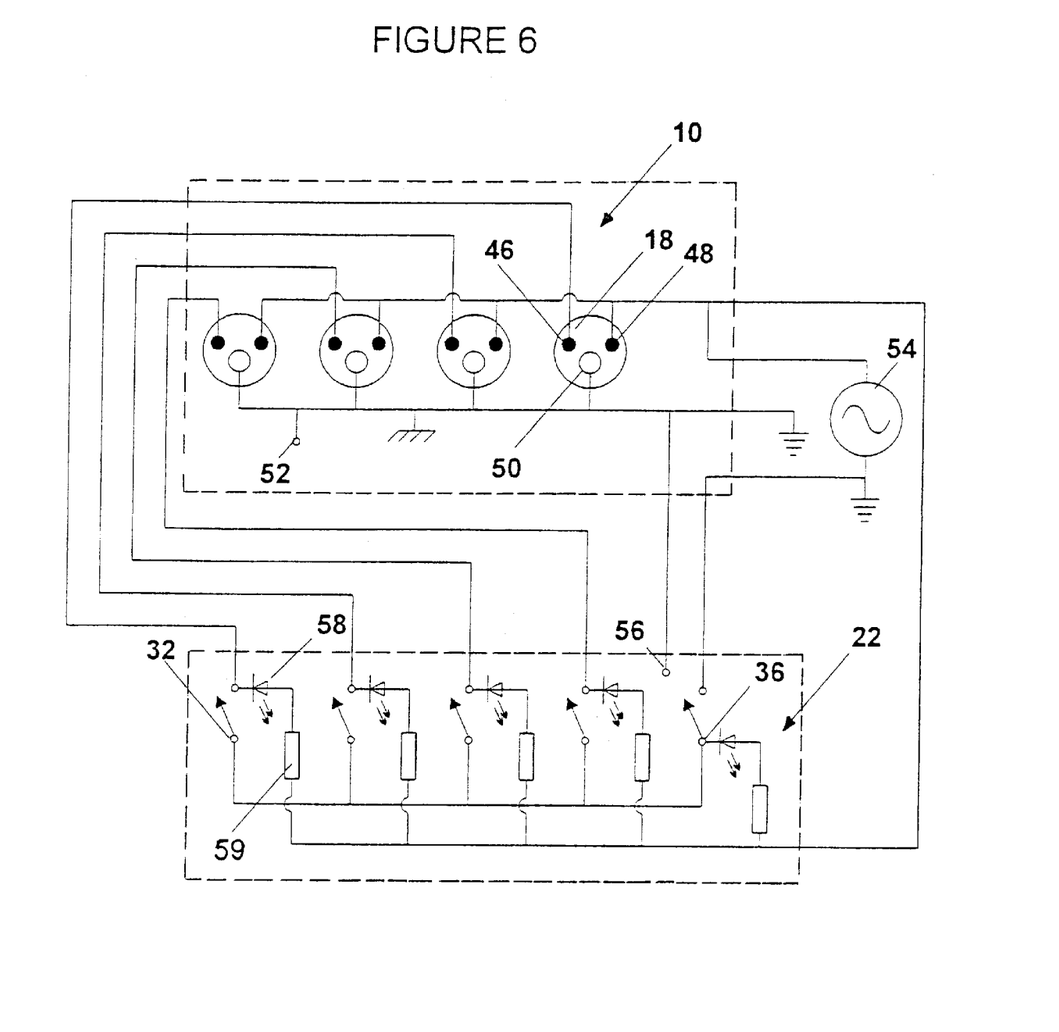
FIG. 6 is a circuit diagram of the slave power bar of FIG. 1 and its connection to the master remote control of FIG. 2.

Turning to FIG. 6, circuitry for a four-socket slave power bar unit 10 and a five-switch master remote control unit 22 is shown. Each outlet 18 contains a neutral connection 46, a live connection 48 and a ground connection 50. The neutral connections 46 and the live connections 48 for each outlet 18 are wired to each respective switch 32 to produce a closed electrical loop. When the switch 32 is closed (or activated), current flows through the switch 32 to the corresponding outlet 18 and provides electricity to a connected electrical device. When the switch is open (or deactivated), a break in the electrical loop occurs and no current may flow and no electricity is provided to the respective outlet 18 and, in turn, the connected electrical device. The master switch 36 works in a similar manner to the switches 32 except that if the master switch 36 is open (or deactivated) no electricity may flow to the outlet 18. The outlets 18 are operational only when the master switch 36 is closed (or activated). The slave power bar unit 10 has a ground connection 52 to the chassis while the three-prong plug is attached to an AC power source 54. The master remote control unit 22 has a ground connection 56 to the chassis. The master remote control unit 22 has a master power switch 36 and individual power outlet switches 32. All switches 32 have a corresponding LED 58 and resistor 59 to indicate if a power circuit is open (LED off) or closed (LED on).

Figure 6A:
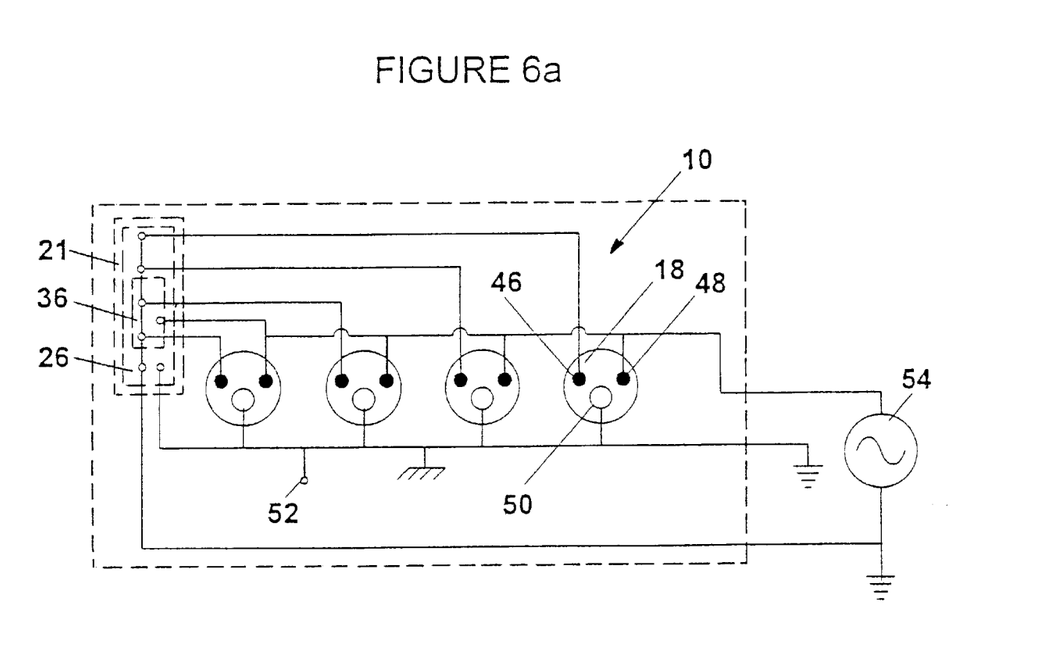
FIG. 6a is a circuit diagram of the slave power bar of FIG. 1.

Turning to FIG. 6a, circuitry for the four-outlet slave power bar of FIG. 1 is shown. It will be understood by one skilled in the art that the remote control unit 22 may be detached from the slave power bar unit 10. If this occurs, the slave power bar unit 10 is able to function as a normal power bar. Each outlet 18 contains neutral connection 46, live connection 48 and ground connection 50. The location of the keyed socket 21, the master power switch 36 and the male plug 26 is also shown. The connection between the AC power source 54 and the neutral connections 46 are all directly connected which causes current to constantly flow from the power source 54 to the outlets 18. The outlets 18 are connected in parallel and are constantly on when the remote control is not connected. In FIG. 6, the connection between the power source 54 and neutral connections 46 included the switch 32 which controlled the operation of the outlets 18.

Figure 7:
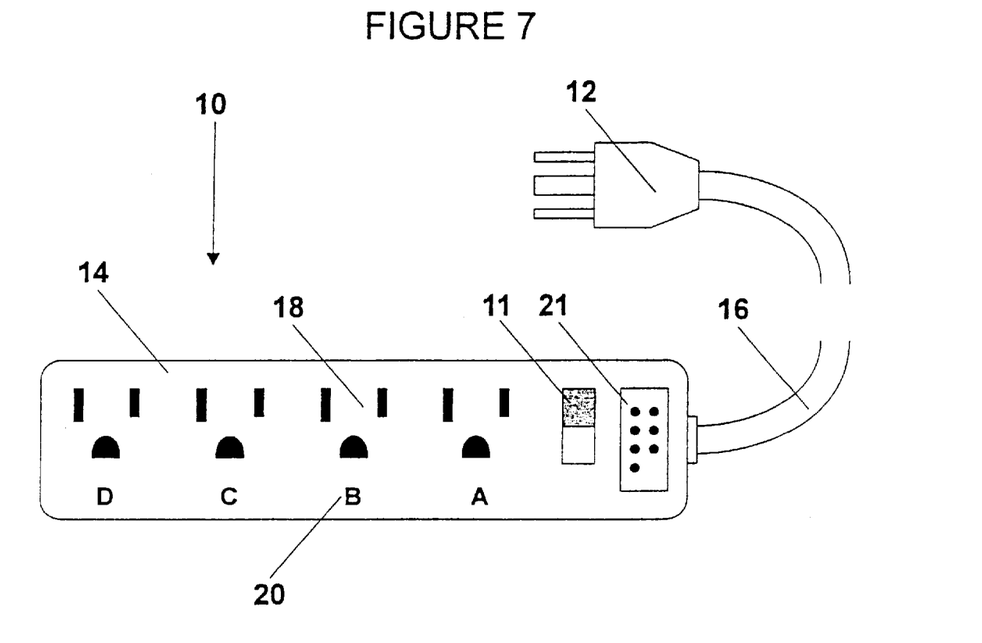
FIG. 7 is a top view of an alternative embodiment of the slave power bar with four outlets.

Turning to FIG. 7, a top view of an alternative embodiment is provided of the slave power bar unit 10. In the alternative embodiment, the power bar unit 10 further includes a master power switch 11. The master power switch 11 provides independent control of the power bar unit 10 but is over ridden if the male plug 26 is connected. The master power switch 11 allows control of the power bar unit 10 without the need for the remote control 22.

Figure 8:
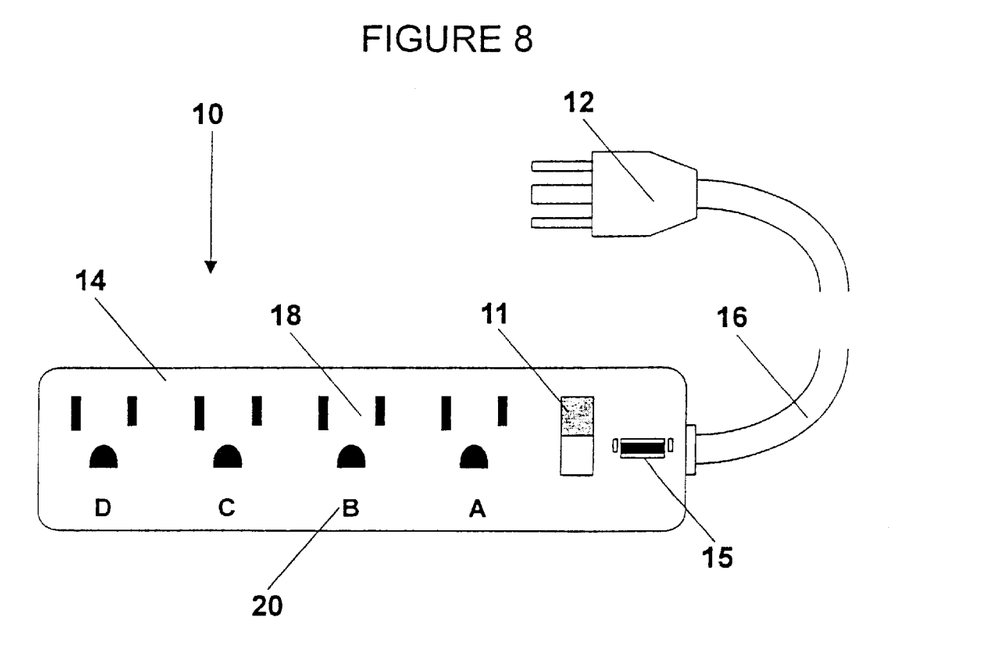
FIG. 8 is a top view of a third embodiment of the slave power bar with four outlets.

Turning to FIG. 8, a third embodiment of the slave power bar unit 10 is shown. A USB A-type receptacle (or USB B-type, not shown) 15 is incorporated within the power bar unit 10 allowing the power bar unit 10 to be controlled via USB protocol. The receptacle 15 allows the remote control unit 22 to control the power bar unit 10 via a Universal Serial Bus Connection. The master power switch 11 is also included to provide independent control of the power bar unit 10 when the remote control unit 22 is not connected.

Figure 9:
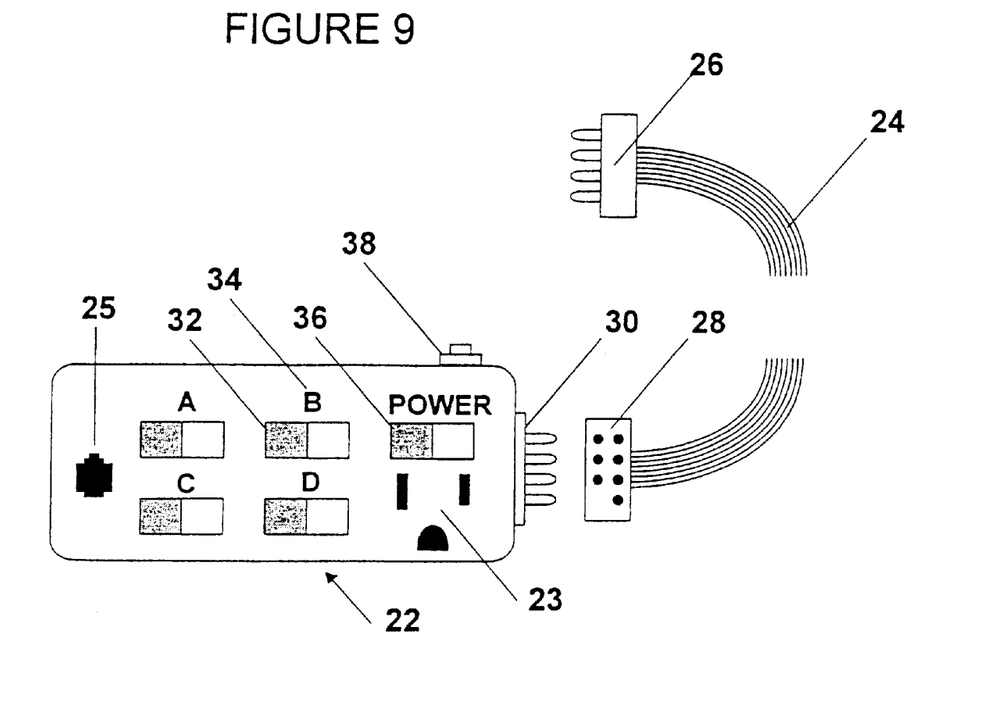
FIG. 9 is a top view of an embodiment of the master remote control and the custom extension cord that connects the master remote control to the power bar.
Figure 10:
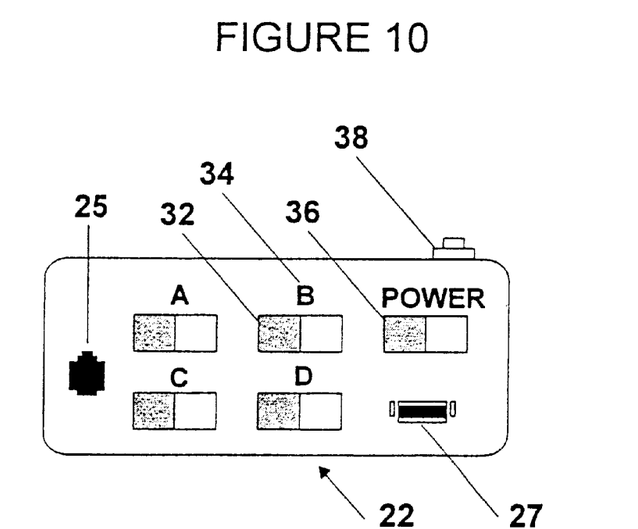
FIG. 10 is a top view of a third embodiment of the master remote control.

Turning to FIG. 9, a top view of an alternative embodiment is provided for the master remote control unit 22. In this alternative embodiment, the remote control unit 22 further includes a telephone jack 25 which allows the user to control the master switch 36 via a telephone. For instance, two rings could turn on the master switch 36 while four rings could turn off the master switch 36. An electrical socket 23 may also be included on the remote control unit 22 for supplying power to other electrical devices such as an answering machine, a cordless phone, or a notebook computer Turning to FIG. 10, a third embodiment of the remote control unit 22 is shown. In this embodiment, a USB A-type receptacle (or USB B-type, not shown) 27 is located in the remote control unit 22. The receptacle 27 allows a Universal Serial Bus to connect the remote control 22 to a power bar unit 10. The connected remote control unit 22 or similar unit located in another device such as a PC, keyboard or monitor controls the power bar unit 10 provided the remote control unit 22, or similar unit in the PC, keyboard or monitor supports the USB protocol. The control unit 22 further includes telephone jack 25 to allow for the user to control the remote control unit 22 from a distant location, as described with respect of FIG. 10.

Figure 11:
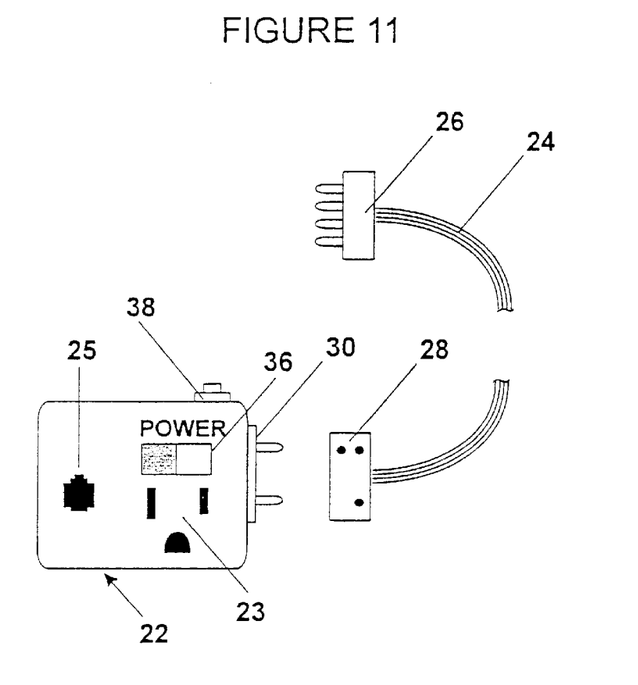
FIG. 11 is a top view of an alternative embodiment of the single switch remote control and the custom extension cord that connects the single switch remote control to the power bar.

Turning to FIG. 11, an alternative embodiment is provided of the single switch remote control unit 22. In the alternative embodiment, the remote control unit 22 further includes a telephone jack 25 which allows the user to control the master switch 36 via a telephone. For instance, two rings could turn on the master switch 36 while four rings could turn off the master switch 36. An electrical socket 23 is included on the remote control unit 22 for supplying power to other electrical devices such as an answering machine, a cordless phone or a notebook computer.

Figure 12:
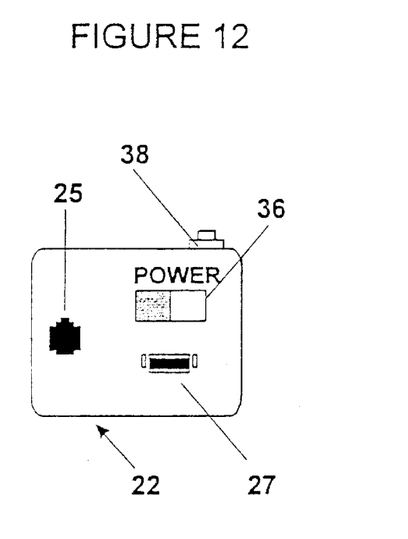
FIG. 12 is a top view of a third embodiment of the single switch remote control.

Turning to FIG. 12, a third embodiment of the single switch remote control unit 22 is shown. In the alternative embodiment, the USB A-type receptacle (or USB B-type, not shown) 27 allows USB connection with a USB compatible slave power bar unit 10 as shown in FIG. 8. The Universal Serial Bus connected remote control unit 22 or similar unit located in another device such as a PC, keyboard or monitor to controls the power bar unit 10, provided the remote control unit, or similar unit in the PC, keyboard or monitor supports the USB protocol. The master control unit 22 further includes telephone jack 25 to allow for the user to control the remote control unit 10 from a distant location.

Figure 13:
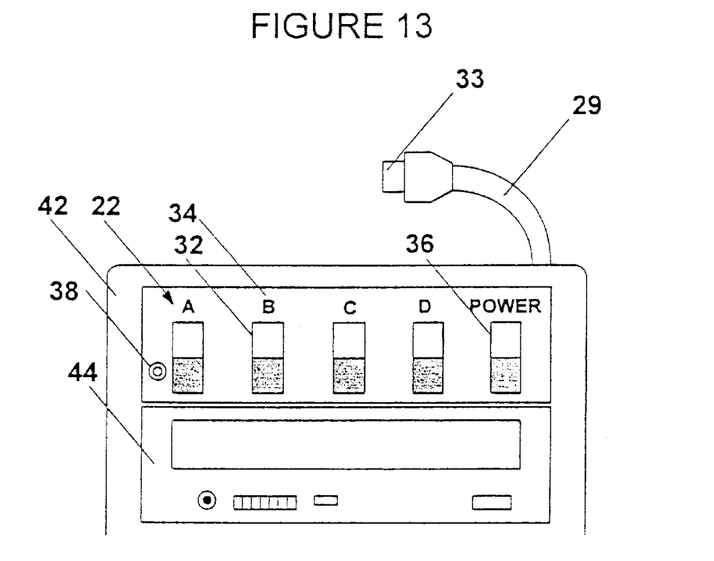
FIG. 13 is a front view of an alternative embodiment of the PC master remote control.

Turning to FIG. 13, an alternative embodiment is provided of the remote control unit 22 connected to the PC 42. In the alternative embodiment, a USB cable 29 is connected at the back of the PC chassis to a USB receptacle (not shown). The cable 29 further connects to a USB plug 33 which in the present invention is A-type (or USB B-type, not shown). The USB plug 33 further connects to the USB receptacle 15 located on the power bar unit 10. The remote control unit 22 can also incorporate optional surge protection circuit reset switch 38.

Figure 14:
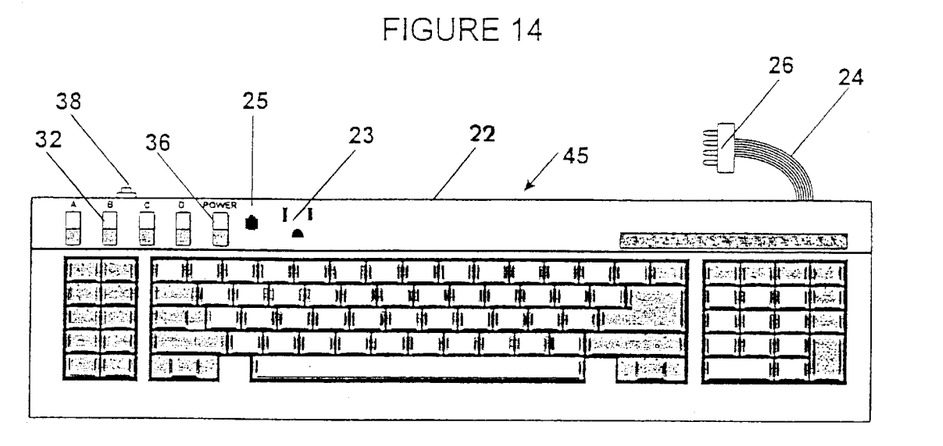
FIG. 14 is a top view of a keyboard incorporating the master remote control.

Turning to FIG. 14, a top view is provided of a keyboard 45 incorporating the remote control unit 22. The keyboard 45 includes male plug 26, which is connected to the keyboard 45 via the custom extension cord 24. The male plug 26 connects with the female socket 21 located on the power bar unit 10. The keyboard 45 also includes switches 32 and the master power switch 36 for remotely controlling the power bar unit 10. The surge protection circuit reset switch 38 provides a safety mechanism for the user. Telephone jack 25 allows the user to control the master power switch 36 via a telephone. For instance, two rings could turn on the master switch 36 while four rings could turn off the master switch 36. The remote control unit 22 further includes electrical socket 23 for providing power to other electrical devices.

Figure 15:
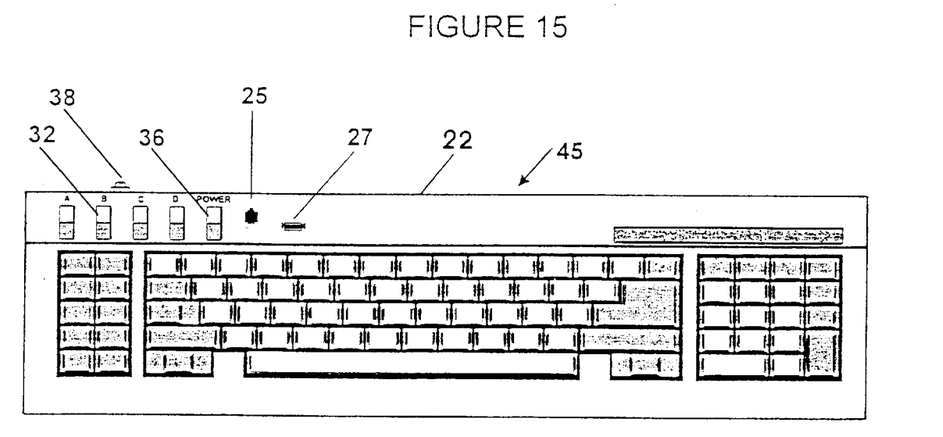
FIG. 15 is a top view of an alternative embodiment of the keyboard incorporating the master remote control.

Turning to FIG. 15, an alternative embodiment of the keyboard 45 is shown. The USB A-type receptacle (or USB B-type, not shown) 27 allows the remote control unit 22 to control the power bar unit 10 via a Universal Serial Bus connection. It will be understood by one skilled in the art that the keyboard does not require the switches 32 and 36. Simple control key strokes may be used i.e. Ctrl-Esc-Enter. The remote control unit 22 further includes telephone jack 25 which allows the user to control the remote control unit 22 from a distant location.

Figure 16:
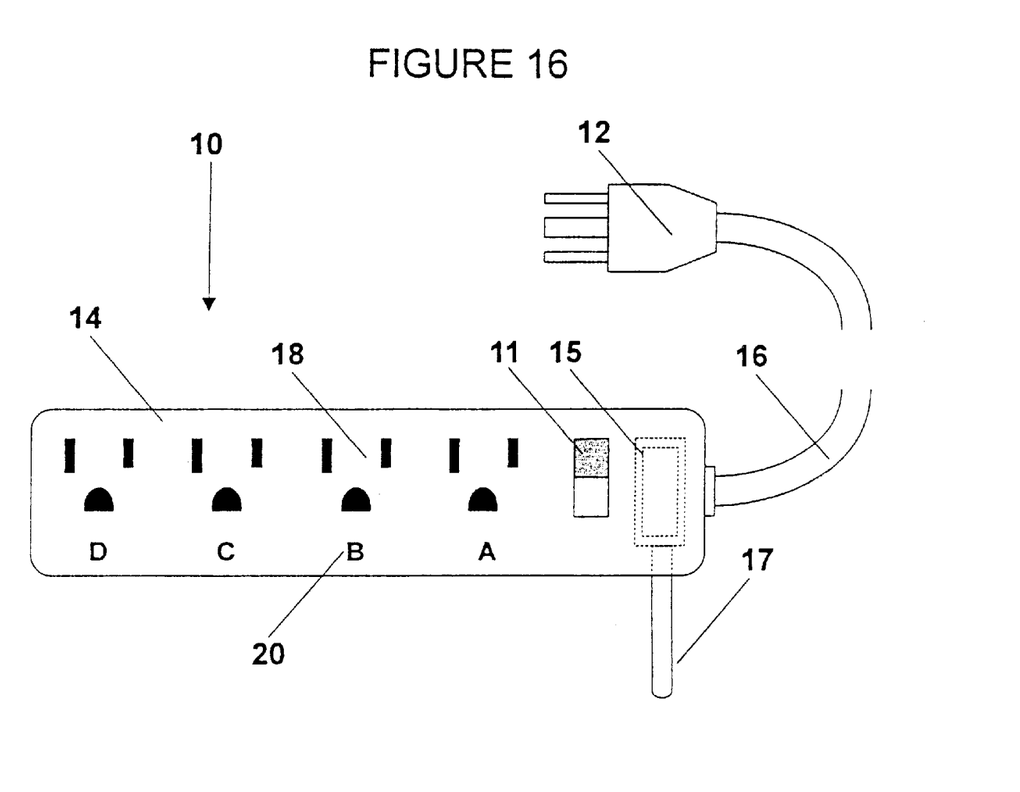
FIG. 16 is a top view of a fourth embodiment of the slave power bar with four outlets.

Turning to FIG. 16, a fourth embodiment of the slave power bar unit 10 is shown. In order to implement wireless control of the slave bar unit 10, receiver and switching circuitry 15 is necessary along with an antenna 17. The circuitry 15 and the antenna 17 receive signals from the remote control unit 22 shown in FIG. 17.

Figure 17:
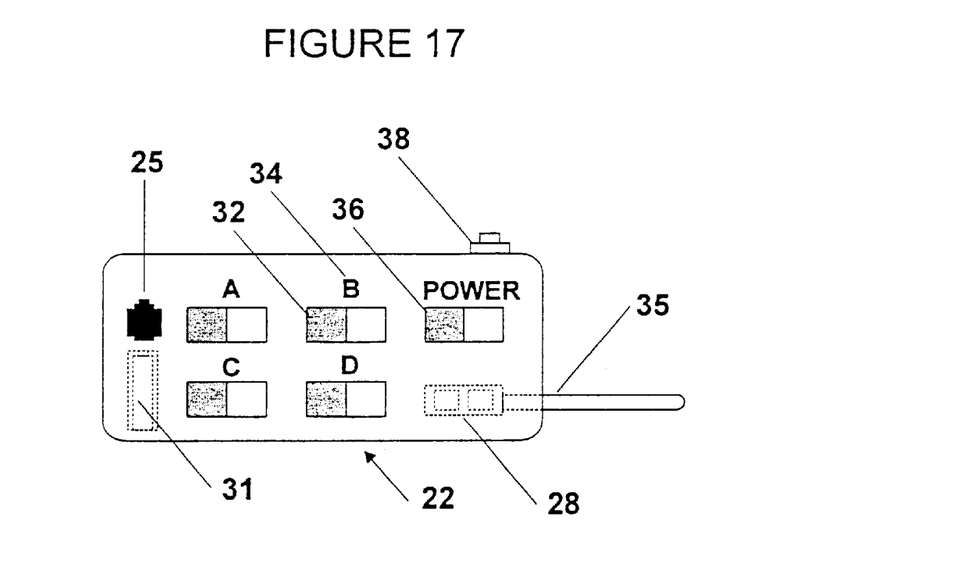
FIG. 17 is a top view of a fourth embodiment of the master remote control.

Turning to FIG. 17, a fourth embodiment of the remote control 22 is shown. In order to implement wireless control of the slave bar unit 10, transmitter and switching circuitry 28 and an antenna 35 are installed within the remote control 22. A battery compartment 31 is also necessary to provide power to the remote control 22. The circuitry 28 and the antenna 35 transmit signals to the slave bar unit 10 in order to control the outlets 18.

Figure 18:
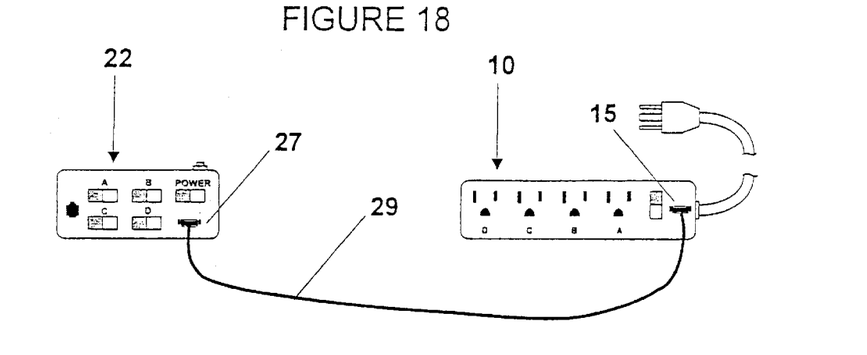
FIG. 18 is a top view of USB wiring connections between the remote control and the slave power bar.

Turning to FIG. 18, USB wiring connections between the remote control unit 22 and the slave bar unit 10 are shown. The USB cable 29 is connected to the USB A-type (or USB B-type, not shown) receptacle 27 located on the remote control 22 and to the USB A-type receptacle (USB B-type, not shown) 15 located on the slave bar unit 10. The USB cable 29 functions in a similar manner to the cord 24.

Figure 19:
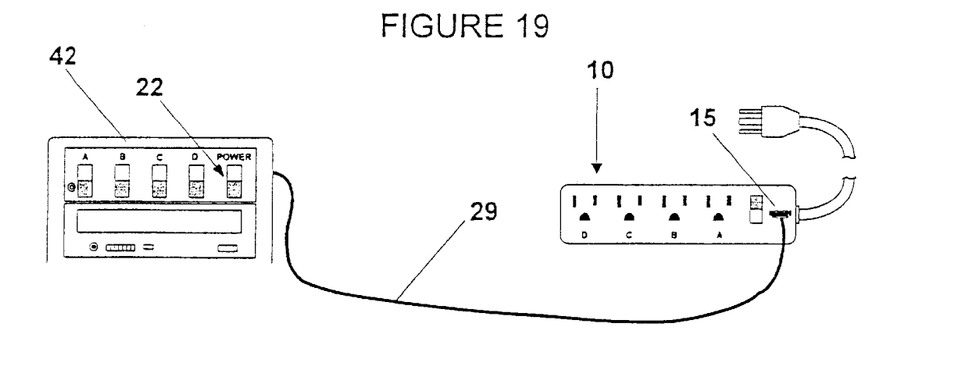
FIG. 19 is a top view of USB wiring connections between the PC master remote control and the slave power bar.

Turning to FIG. 19, USB wiring connections between the remote control 22 (located on the PC 42) and the slave bar unit 10 are shown. The cable 29 connects to a USB receptacle (not shown) located at the back of the PC 42 and the USB A-type receptacle (or USB B-type, not shown) 15 located on the slave bar unit 10. The USB cable 29 functions in a similar manner to the cord 24.

Figure 20:
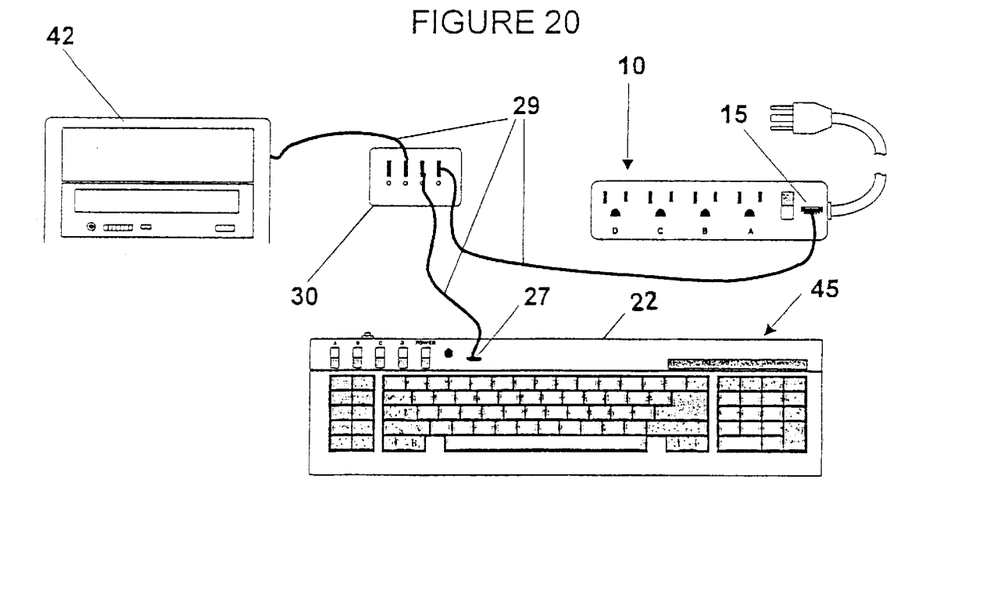
FIG. 20 is a top view of a third USB wiring connection.

Turning to FIG. 20, a third USB wiring connection is shown. In this embodiment, a USB hub 30 is used to allow remote control 22, in this case installed in keyboard 45, to control the slave bar unit 10. Both the remote control 22 and the keyboard 45 are connected via USB cables 29 to the hub 30 which is connected by USB cable 29 to the slave power bar unit 10.

Figure 21:
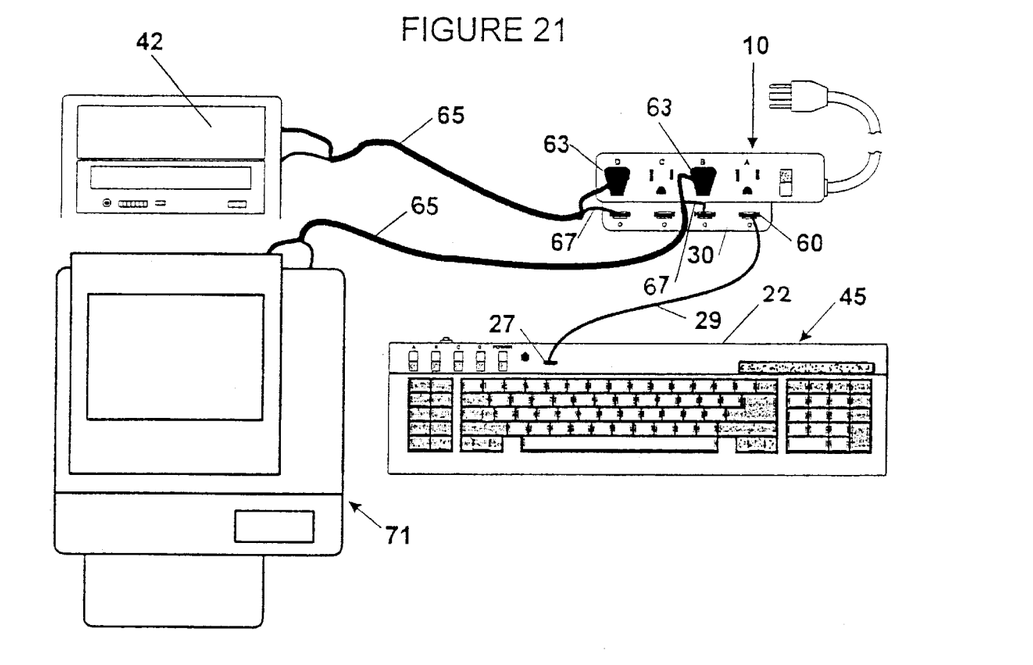
FIG. 21 is another alternative embodiment of the slave power bar with an integrated USB hub.

Turning to FIG. 21, another alternative embodiment of the slave power bar unit 10 is shown. In this embodiment, the slave power bar unit 10 includes a USB hub 30 which is either built-in or detachable. By combining the hub 30 and the power bar unit 10, only a single composite cord 65 (combining a power cord 63 with a USB cable 67) is needed to connect between a peripheral device (e.g. printer 71) and the power bar 10 and hub 30 combination. The hub 30 includes receptacles 60 which may be either A-type or B-type. Standard power cords and USB cables 29 may still be used instead of the composite cord 65. By including the hub 30 with the slave bar power unit 10 costs for the hub 30 is lowered since it may be powered directly by the power bar 10 via a built-in transformer (not shown) instead of using an external transformer unit. The slave power bar unit 10 can still be controlled by the remote control unit 22. As described above, the remote control unit 22 may be incorporated in the keyboard 45 (as shown) or in the PC 42 (not shown).

Figure 22:
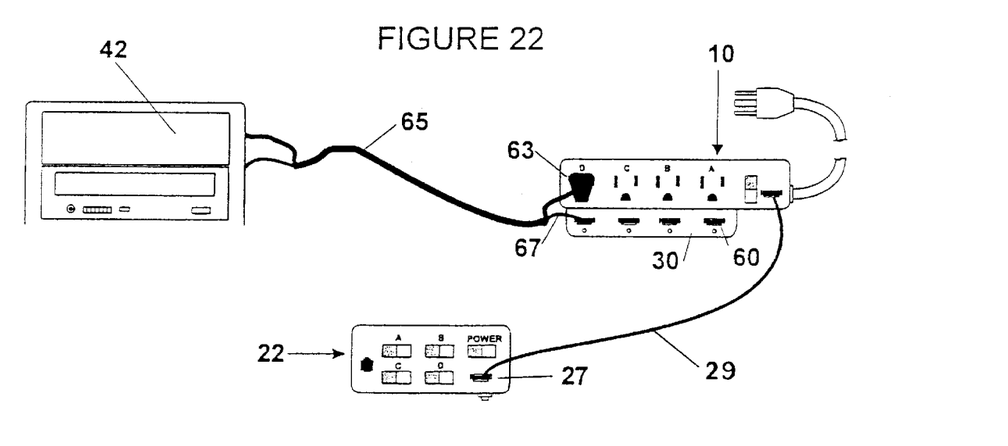
FIG. 22 is another alternative embodiment of the USB wiring connection.

Turning to FIG. 22, the slave power bar 10 and the hub 30 combination are shown connected to a remote control unit 22 via a USB cord 29. The slave bar unit 10 and hub 30 combination function in the same manner as disclosed in FIG. 21 above.

Figure 23:
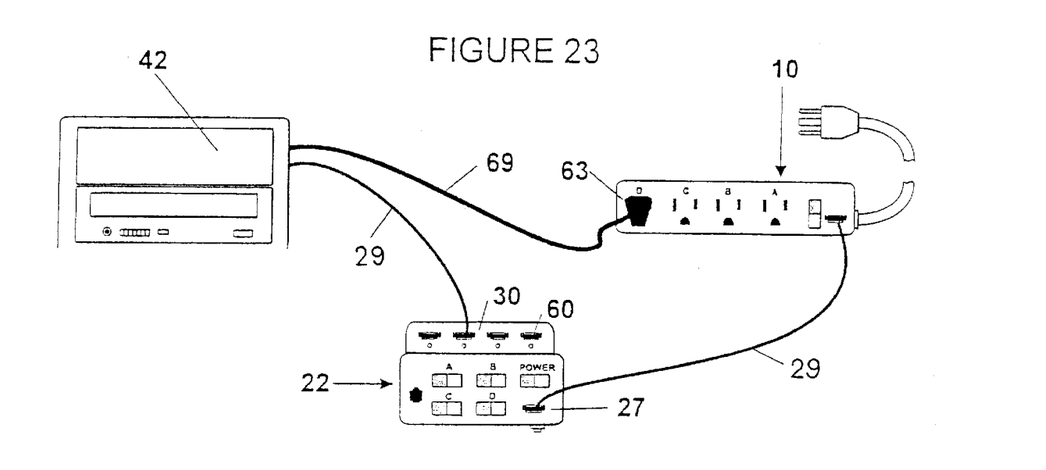
FIG. 23 is another alternative embodiment of the master remote control.

Turning to FIG. 23, an alternative embodiment of the remote control unit 22 is shown. In this embodiment, the remote control unit 22 includes a USB hub 30 which is either built-in or detachable. The hub 30 includes receptacles 60 which may be either A-type or B-type. By combining the remote control unit 22 and the USB hub 30, desktop clutter is reduced. The remote control unit 22 is still connected via a USB cord 29 to the slave bar power unit 10. A standard power cord 69 connects the PC 42 to the power bar unit 10 while a USB cable 29 connects the PC 42 to the hub 30 in order to permit data communications between the PC and other USB devices (not shown).

Figures 24, 25:
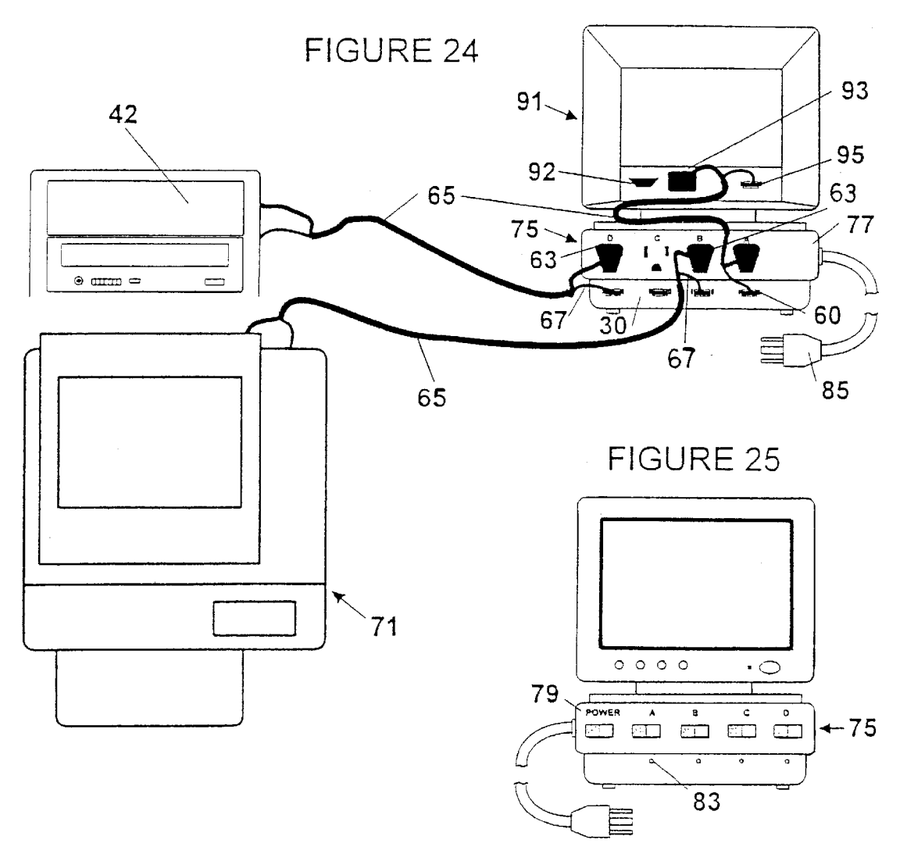
FIG. 24 is a back view of a power box with an integrated USB hub.
FIG. 25 is a front view of the alternative embodiment of FIG. 24.

Turning to FIG. 24, another embodiment of the PC master remote control unit and power bar unit is shown. A panel of a standalone power box unit 75 comprising the power box's power bar 77 and the built-in or detachable hub 30 is shown. Incorporating the power box's power bar 77 and the hub 30 allows a single composite cord 65 (combining a power cord 63 with a USB cable 67) to connect between a peripheral device (e.g. printer 71) and the power box's power bar 77 and hub 30 combination to provide power and permit data communications. For instance, a computer monitor 91 connects to the power box 75 via a female socket 93 and USB receptacle 95 (either A-type or B-type). Computer monitor 91 also includes a VGA socket 92.

Turning to FIG. 25, a front view of the embodiment described in FIG. 24 is provided. The power box's power bar unit 77 can be operated by the PC remote control unit 79 located at the front of the power box 75. The PC remote control unit 79 is incorporated with the power box 75. LEDs 83 are included in the front of the power box 75 to enable users to easily monitor each hub receptacle 60.

Figure 26:
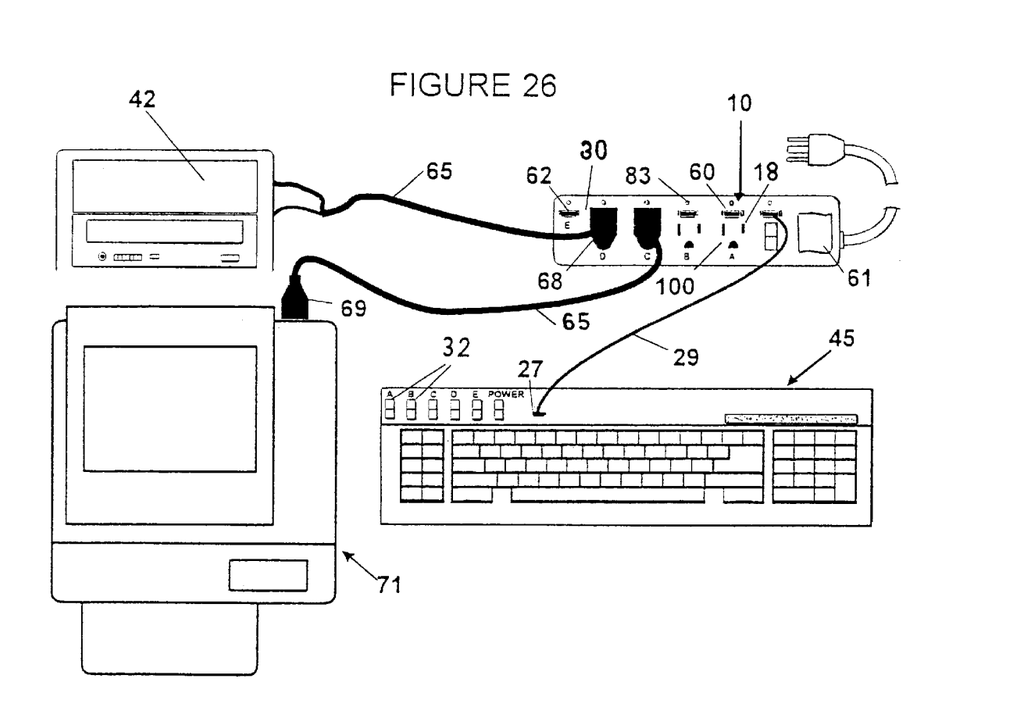
FIG. 26 is another alternative embodiment of the slave power bar with an integrated USB hub.
Figure 30:
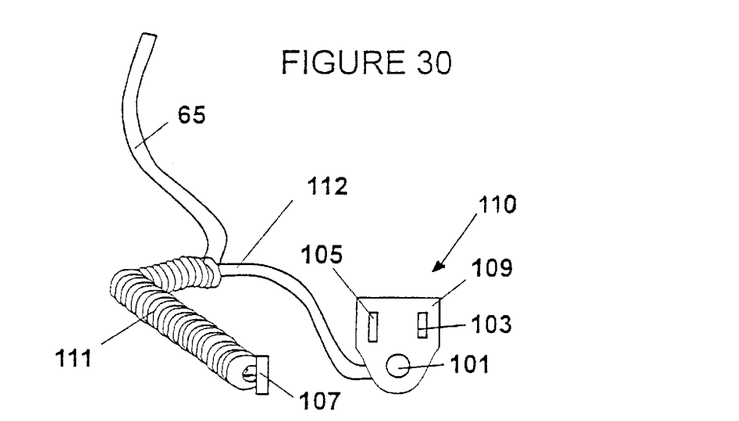
FIG. 30 is a third embodiment of a dual AC power and USB plug.

Turning to FIG. 26, another alternative embodiment of the slave power bar is shown. By integrating a slave power bar 10 and a USB hub 30, each power outlet 18 has an associated USB receptacle 60 on the slave power bar unit 10 (to form a power outlet and USB receptacle combination 100). An integrated dual AC power and USB plug 68 may be used to connect one end of the single composite cord 65 while the other end may be connected to the back of the PC 42. In order to integrate the USB hub 30, a transformer 61 is needed to power the hub. Similarly, the integrated dual AC power and USB plug 68 may connect the single composite cord 65 to a periperhal device (e.g. a printer). It is necessary for the single composite cord 65 to have an integrated dual AC power and USB plug 69 manufactured for connection with a peripheral device (which is printer 71 in the present embodiment). Also, the single composite cord 65 can have a separate power plug and USB plug (as shown in FIG. 30) for connection with the standard USB peripheral devices. In the present invention, the keyboard 45 acts as the remote control. It will be understood by those skilled in the art that if USB or Firewire protocol is used, the keyboard does not require the switches 32 but can be a generic USB keyboard. Control of the slave power bar 10 can be achieved by using special combined keystrokes (e.g. CTRL-SHIFT-F1 to control the master power switch). The keyboard 45 still requires USB cord 29 to connect the USB receptacle 27 to the slave power bar 10. An extra standalone USB socket 62 may be included to to connect and control a low-power USB device (e.g. USB audio speakers) which does not require AC power.

Figure 27:
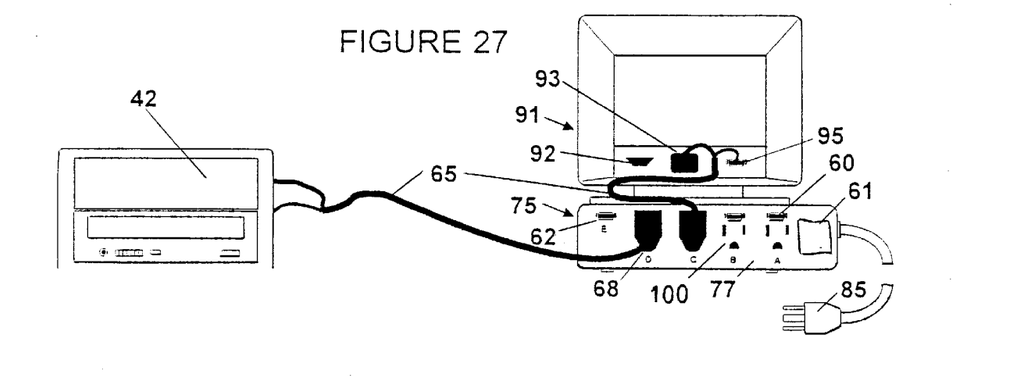
FIG. 27 is a top view of another embodiment of USB wiring connections between the PC master remote control and the slave power bar.

Turning to FIG. 27, alternative USB wiring connections for an under-the-monitor power box with built in switches (see FIG. 25 for front view) are shown. The cord 65 connects to a USB receptacle (not shown) located at the back of the PC 42 to the power outlet and USB receptacle combination 100. This allows the use of the integrated dual AC power and USB plug 68 to be used. Computer monitor 91 connects to the power box 75 via female socket 93 and USB receptacle 95 (either A-type or B-type). A VGA socket 92 is also provided at the back of the computer monitor 91. The power box 75 may also include a transformer 61 for providing DC power to the built-in USB hub. Transformer 61 provides power to the integrated hub.

Figure 28:
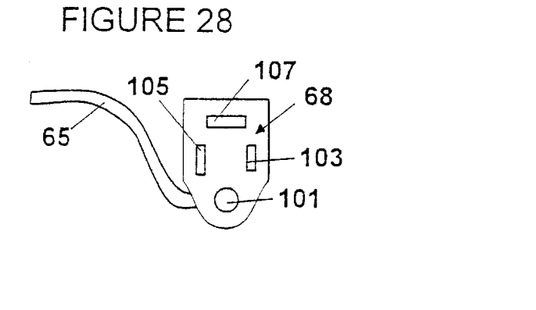
FIG. 28 is first embodiment of a dual AC power and USB plug.
Figure 29:
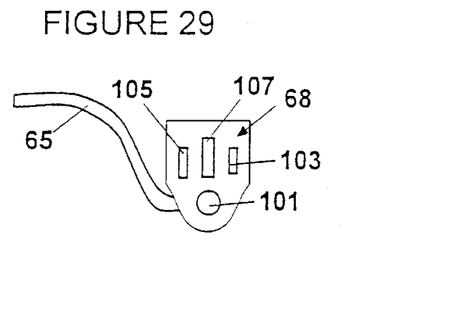
FIG. 29 is a second embodiment of a dual AC power and USB plug.

Turning to FIGS. 28 and 29, embodiments of the integrated dual AC power and USB plug 68 is provided. Both embodiments of the plugs 68 include the dual AC power/USB cable 65, a ground flange 101, a live power flange 103, a neutral power flange 105 and a USB connector 107. The difference in the embodiments is in the placement of the USB connector 107. The connector 107 may be either perpendicular to the two power flanges 103 and 105 as in FIG. 28 or parallel to the power flanges 103 and 105 as in FIG. 29.

Turning to FIG. 30, yet another embodiment of a plug 110 used for connection to the slave power bar and hub combination is shown. The difference between the plug 110 and the plug 68 is that the USB connector 107 is separate from a standard AC power plug 109. However, one skilled in the art will understand that separate or combined, the plugs 68 and 110 perform the same function. The dual AC power/USB cable 65 is split so that a coiled USB cable 111 leads to the US connector 107 and a standard AC power cord 112 leads to the AC power plug 109.

The USB hub configurations can also be applied to future hub configurations that implement Firewire (IEEE 1394) or High Performance Serial Bus (HPSB) technology.

It will be appreciated that, although a particular embodiment of the invention has been described and illustrated in detail, various changes and modifications may be made. One such modification is that the power bar unit 10 (or 75) may be manufactured as a 120 volt/60 cycle or a 240 volt/50 cycle AC version. Also, although a four outlet power bar 14 has been disclosed in the preferred embodiment, however, the power bar 14 could contain fewer or more outlets than four. Another modification is in the connection of the remote control unit 22. In the preferred embodiment, the male plug 26 and the extension cord 24 provide the connection between the remote control unit 22 and the power bar unit 10. The connection may be alternatively provided through a wireless connection and thus the remote control unit 22 does not have to be directly connected to the power bar unit 10 for use. Wireless communication between the remote control unit 22 and the power bar unit 14 may be analog or digital. One example of how wireless communication can be implemented is by using radio frequencies to turn power on and off to the sockets 18 on the power bar 14. Also, four separate embodiments have been disclosed. It is possible to combine two or more of the embodiments without affecting the present invention. Finally, the remote control unit 22 may be modified to include an outlet for use with a notebook computer. This modification allows the power bar unit 10 to be hidden and provides easier access for the user to plug in the notebook computer. Also, although the remote control unit 22, the slave power bar unit 10 and the USB hub 30 have been discussed in a computer environment, one skilled in the art will understand that any the present invention may be used in any environments which require multiple outlets or the use of a power bar.

Although preferred embodiments of the invention have been described herein in detail, it will be understood that those skilled in the art can make modifications thereto without departing from the spirit of the invention or the scope of the appended claims.

What is claimed is:

1. A remote controlled power bar system comprising:
   a power bar unit with at least one power outlet and an electrical cord for connecting said power bar unit to an electrical socket; and
   a remote control, connected to said power bar unit using Universal Standard Bus (USB) or Firewire protocol, having means for generating a signal unique to each of said at least one power outlet for control of and communication with said at least one power outlet.

2. The remote controlled power bar system of claim 1 wherein said remote control further comprises means for controlling all of said at least one power outlet on said power bar unit.

3. The remote controlled power bar system of claim 2 wherein said remote control further comprises a telephone jack for voice activated control of said means for controlling all of said at least one power outlet on said power bar unit.

4. The remote controlled power bar system of claim 1 wherein said remote control further comprises a power outlet.

5. The remote controlled power bar system of claim 1 wherein said power bar unit or said remote control further comprise surge protection circuitry.

6. The remote controlled power bar system of claim 1 wherein said remote control is housed in computer peripheral device.

7. The remote controlled power bar of claim 1 wherein said means for generating said signal is an associated switch wherein when said switch is closed, a power on signal is generated and when said switch is open, a power off signal is generated.

8. The remote controller power bar system of claim 1 wherein said power bar unit further comprises an integrated USB hub and a transformer for providing power to said integrated USB hub.

9. A remote controlled power bar system comprising:
   a power bar unit with at least one power outlet and an electrical cord for connecting said power bar unit to an electrical socket; and
   a remote control, connected to said power bar unit using Universal Standard Bus (USB) or Firewire protocol, having means for generating a signal unique to each of said at least one power outlet for control of and communication with said at least one power outlet;
   wherein said remote control further comprises a telephone jack for voice activated control of said means for generating a signal.

10. The remote controlled power bar system of claim 9 wherein said remote control further comprises a power outlet.

11. The remote control power bar system of claim 9 wherein said power bar unit further comprises an integrated USB hub and a transformer for providing power to said integrated USB hub.

12. A remote controlled power bar system comprising:
   a power bar unit with at least one power outlet and an extension cord for connecting said power bar unit to an electrical socket;
   at least one remote control having means for generating a signal unique to each of said at least one power outlet for control of and communication with said at least one power outlet;
   a hub connecting said power bar unit and said at least one remote control; and
   wherein said hub is a USB or Firewire hub.

13. The remote controlled power bar system of claim 12, wherein said means for generating said signal is an associated switch wherein when said switch is closed, a power on signal is generated and when said switch is open, a power off signal is generated.

* * * * *